United States Patent

Fisher

[15] 3,674,880

[45] July 4, 1972

[54] METHODS FOR PREPARING VALUABLE KETO AND HYDROXY CYCLIC COMPOUNDS

[72] Inventor: Charles H. Fisher, 1624 Mirabeau Avenue, New Orleans, La. 70122

[22] Filed: Jan. 3, 1968

[21] Appl. No.: 695,323

[52] U.S. Cl. ................260/621 R, 260/339, 260/348.5 R, 260/617 R, 260/618 H, 260/586 R
[51] Int. Cl. ...........................................C07c 37/00
[58] Field of Search ............260/621 G, 339, 621 H, 586 B, 260/586 R, 348.5 R, 621 R

[56] References Cited

UNITED STATES PATENTS

| | | | |
|---|---|---|---|
| 2,871,260 | 1/1959 | Drysdale | 260/339 |
| 2,678,951 | 5/1954 | Smith | 260/621 |
| 3,446,856 | 5/1969 | Hamilton et al. | 260/621 |

OTHER PUBLICATIONS

Fieser et al., " Advanced Organic Chemistry" (1961) pp. 179–180

Fieser et al., " Advanced Organic Chemistry" (1961) pp. 158–160
Noller, " Chemistry of Organic Compounds" 3rd edition (1965) Noller, pg. 105
Noller, " Chemistry of Organic Compounds" 3rd Edition (1965) pp. 219–220
Noller, " Chemistry of Organic Compounds" 3rd Edition (1965) pp. 818–820

*Primary Examiner*—Leon Zitver
*Assistant Examiner*—Norman Morgenstern
*Attorney*—R. Hoffman and W. Bier

[57] ABSTRACT

This invention relates to the conversion of poly-exomethylene cyclohexanes and poly-exomethylene cylcohexenes to ketone cyclic compounds and hydroxy aromatic compounds. The exo-methylene groups ( $= CH_2$ ) are first converted to ozonides and the ozonide is then converted to ketones which rearrange to the hydroxy cyclic and aromatic compounds.

The resultant hydroxy compounds are used as antioxidants, preservatives, intermediates for making resins, plastics, adhesives, pharmaceuticals, and dyes.

5 Claims, No Drawings

METHODS FOR PREPARING VALUABLE KETO AND HYDROXY CYCLIC COMPOUNDS

A world-wide, nonexclusive, irrevocable, royalty-free license in the invention herein described, for all purposes of the United States Government, with the power to grant sublicenses for such purposes, is hereby granted to the Government of the United States.

FIELD OF THE INVENTION

The present invention relates to improved methods for preparing oxygenated cyclic compounds.

It is a prime object of my invention to make keto and hydroxy cyclic compounds and their derivatives by a novel process characterized by its simplicity and its economy.

It is my further object to transform selected polyunsaturated cyclohexane, cyclohexene, and cyclooctane derivatives into keto and hydroxy cyclic compounds.

It is my still further object to make the keto and hydroxy cyclic compounds and their derivatives from products obtainable from low-cost chemicals, including allene and acetylene, which are derived from petroleum and coal.

It is a still further object to transform polymers and products derived from allene and acetylene by my novel process into hydroxy aromatic compounds and their derivatives.

It is my still further object to make phloroglucinol from certain of these polymers and products obtainable from allene and acetylene.

DEFINITION OF TERMS

As contemplated in the present invention, the term "hydroxy cyclic compounds" includes phenol (I), resorcinol (II), catechol (III), hydroquinone (IV), hydroxyhydroquinone (V), phloroglucinol (VI), and derivatives of these hydroxy compounds. The derivatives may be alkyl or aryl. Because of the potential wide use of low-cost phloroglucinol, this compound, sometimes referred to below as (VI), will be used frequently as an example to illustrate my invention. However, it is to be understood that the use of (VI) is illustrative, and the invention is not to be restricted to (VI) or its derivatives.

The products so prepared have a variety of commercial uses including antioxidants, preservatives, inhibitors, and intermediates for making resins, plastics, adhesives, pharmaceuticals, and dyes. Most important, the process is efficient and unexpectedly economical.

The names of all formulas are listed by the side of the Roman number in Table I.

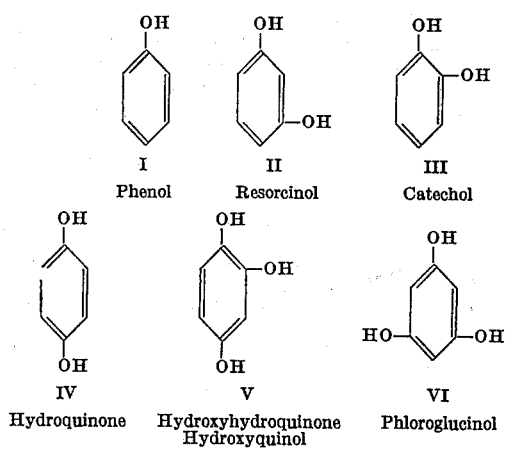

I Phenol
II Resorcinol
III Catechol
IV Hydroquinone
V Hydroxyhydroquinone Hydroxyquinol
VI Phloroglucinol The term "polymers of allene" as used herein, comprises the trimers and tetramers resulting from the polymerization of certain olefinic compounds derivable from petroleum and coal, particularly allene. Methods for polymerizing allene into unsaturated trimers including 1,3,5-trimethylene cyclohexane (VII), 1,2,4-trimethylene cyclohexane (VIII) or unsaturated tetramers such as 1,3,5,7-tetramethylene cyclooctane (IX) are known. Related products are the cyclohexenes and cyclooctenes which will be discussed more fully below. These polymers and products (VII), (VIII), and (IX) are old in the art and their preparation does not form a part of my invention which is specifically directed to novel methods for transforming trimers such as (VII), (VIII), and tetramers such as (IX) and certain related compounds into the corresponding keto and hydroxy cyclic compounds.

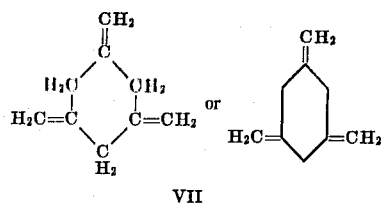

VII
1, 3, 5-trimethylene cyclohexane

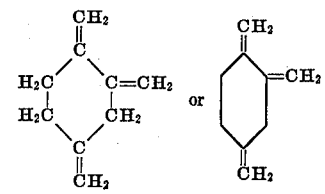

VIII
1, 2, 4-trimethylene cyclohexane

TABLE I

| | |
|---|---|
| I | Phenol (1-OH benzene) |
| II | Resorcinol (1,3-di OH benzene) |
| III | Catechol (1,2-di OH benzene) |
| IV | Hydroquinone (1,4-di OH benzene) |
| V | Hydroxyhydroquinol (1,2,4-tri OH benzene) |
| VI | Phloroglucinol (1,3,5-tri OH benzene) |
| VII | 1,3,5-trimethylene cyclohexane |
| VIIa | 1,3,5-triketo cyclohexane |
| VIII | 1,2,4-trimethylene cyclohexane |
| IX | 1,3,5,7-tetramethylene cyclohexane |
| X | 1,3,5-triarylmethylene or 1,3,5-trialkylmethylene cyclohexane |
| XI | 1,3,5-hexa alkyl (aryl) cyclohexane |
| XII | 1 keto-3,5-dimethylene cyclohexane |
| XIII | 1-hydroxy-3,5-cyclohexene-1 |
| XIV | 1,3-diketo,5-methylene cyclohexane |
| XV | 1-hydroxyl-3-keto-5 methylene cyclohexene-1 |
| XVI | 3,5-dimethyl phenol |
| XVII | 1,3-diketo-5-methylene cyclohexane |
| XVIII | 3-hydroxy-5-methyl phenol |
| XIX | 2-methyl-1,3,5-trimethylene cyclohexane |
| XX | 2-methyl phloroglucinol |
| XXI | 2-phenyl-1,3,5-trimethylene cyclohexane |
| XXII | 2,4-dimethylene cyclohexene-1 |
| XXIIIa | 2,3-dimethylene cyclohexene-1 |
| XXIIIb | 3,4-dimethylene cyclohexene-1 |
| XXIV | 2,5-dimethylene cyclohexene-1 |
| XXV | 2,4-dimethylene cyclohexene oxide |
| XXVI | 2,4-diketo cyclohexene oxide |
| XXVII | 1,2-dihydroxy-3,5-diketo cyclohexane |

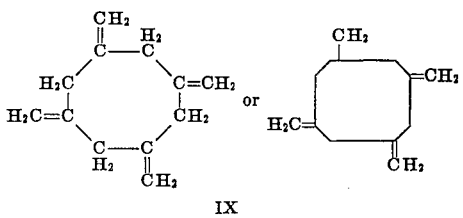

1,3,5,7-tetramethylene cyclooctane

PRIOR ART

In British Pat. No. 812,902 (May 6, 1959), the 1,3,5- and the 1,2,4-trimethylene cyclohexanes (VII and VIII, respectively) are prepared by heating allene at 70°–130° C. in intimate contact with nickel carbonyl phosphine or phosphite complex. Resultant polymers and products are claimed to possess valuable air-drying properties useful in making films and coatings.

Various reactions of these trimers are discussed also by Benson & Lindsey, Jr., in an article in the J. Am. Chem. Soc. 81, 4247 (1959). However, this discussion is silent concerning the oxidation of these ring compounds to give oxygenated cyclic compounds. Luttinger (J. Org. Chem. 27, 1591 (1962)) also discusses the polymerization of allene and related products.

In the past, attempts have been made to prepare phloroglucinol (VI) economically from various raw materials. Thus far, these attempts have been unsatisfactory.

In a typical commercial method, phloroglucinol is prepared by a 4-step process as follows:
1. Nitrate toluene to trinitrotoluene (TNT),
2. Oxidize TNT to trinitro benzoic acid,
3. Reduce the product of step (2) to give triaminobenzene, the decarboxylation occurring simultaneously, and 4. Hydrolyze the product of step (3) to form phloroglucinol.

This method has at least four serious disadvantages:
1. The oxidation of the TNT to trinitrobenzoic acid is hazardous. Overheating must be avoided and the oxidant (dichromate) must be added in small increments. Consequently, careful and constant supervision must be maintained.
2. The oxidation is carried out in water-cooled, jacketed-steel pots using a sulfuric acid solution. This acid has a corrosive action on these oxidation pots, and the inner surface must be carefully inspected for pits after each series of runs in order to avoid leakage of the cooling water into the reaction mixture.
3. Steps (3) and (4) are completed in strong hydrochloric acid and glass lined vessels must be used. These are expensive and easily chipped. In the latter case, the metal surface is exposed to the action of the hydrochloric acid which also presents a hazard.
4. The process is expensive, the price of the phloroglucinol ranging from as high as $16.00–$17.75 per pound to technical grades selling at about $8.00 per pound.

Therefore, prior to the present invention, there still remained a need for a commercially-suitable process for converting economical raw materials into phloroglucinol and related hydroxy aromatic compounds at low cost. Such a process should be simple and easily carried out in presently available commercial equipment. It should produce economical, commercially acceptable hydroxy aromatic compounds. Last, but not least, it should be free of the hazardous steps of nitration and handling of polynitro compounds.

SUMMARY OF THE INVENTION

In general, the overall process of the present invention may be simply described. As noted above, allene, or other olefinic hydrocarbons, or mixtures of unsaturated hydrocarbons, is converted into exo-methylene cycloalkanes and alkenes (unsaturated cyclic hydrocarbons) such as exo-methylene ($CH_2$) cyclohexanes and cyclohexenes and exo-methylene cyclooctanes and cyclooctenes by processes known to those skilled in the art. These exo-methylene cyclo-compounds are then subjected to an oxidation by strong oxidizing agents such as permanganate, peroxy acetic acid (frequently called peracetic acid) or by ozonolysis. I prefer ozonolysis in a mildly alkaline solution.

The following examples are illustrative of the uses to which my invention can be put. However, it will be obvious to those skilled in the art that the process is of general applicability and that the examples do not limit the scope of invention.

EXAMPLE 1

One mole (120 g.) of 1,3,5-trimethylene cyclohexane (VII) is dissolved in about from 750 to 1,000 ml. of a suitable, inert, solvent (e.g. methylene chloride) and then added to a weakly alkaline sodium hydroxide solution containing 3 to 6 moles sodium hydroxide. I prefer to use 0.1 to 0.2 N sodium hydroxide solution. Cyclic amines such as pyridine or quinoline also may be used.

The methylene chloride solution of product (VII) and the aqueous sodium hydroxide are placed in a three-neck ozonizing vessel equipped with an ozone inlet, an outlet and a high-speed agitator. A temperature-measuring device is also attached by suitable means. The ozone inlet is attached to any gas-measuring device known to those skilled in the art, which device in turn is attached to an ozone generator or other commercially available ozone source. Using standard procedures the quantity (moles) of ozone introduced into the reaction vessel may be computed and will facilitate determination of the end of the ozonolysis by comparing the amount of ozone entered into the reaction vessel with the amount of ozone required to form the ozonides. This will be discussed more fully below.

The methylene chloride solution of the exo-methylene cyclohexane is not completely water soluble. Consequently, vigorous stirring is required to disperse the methylene chloride solution in the aqueous system. Any gas after passing from the exiting tube then enters an upright cylindrical tube equipped with a two-hole stopper, said cylindrical tube containing a potassium iodide-starch solution. The presence of ozone liberates iodine from the KI solution and this iodine is absorbed by the starch, forming a bluish color. (See Inorganic Qualitative Analysis by Griffin — Second Edition, Blakiston Company, Inc., Toronto, Canada, 1954.)

The second hole of the 2-hole stopper is connected to gum rubber tubing, the outer end of which is closed tightly by any suitable means such as a metallic clamp. As is well known, ozone permeates gum rubber readily. Therefore, the gum rubber tube serves as a second signal when the take-up of ozone by the exo-methylene cycloalkanes and alkenes is completed. It is an advantage during the ozonolysis that the bottom end of the ozone inlet tube be placed near the bottom of the reaction vessel, to increase the contact time between the ozone and the emulsion.

During passage of the ozone ($O_3$) through the vigorously agitated emulsion, the ozone reacts with the exo-methylene group forming an ozonide, one mole ozone being required for each ($CH_2$) groups.

The ozone should enter the reaction vessel at a sufficiently slow rate so that all the ozone is reacted with the exo-methylene ($CH_2$) groups. When this reaction is complete, bubbles of ozone will pass through the exit tube and into the potassium-iodide solution, liberating free iodine which is sorbed by the starch and, as noted above, results in a blue coloration.

The resulting ozonide mixture is then added gradually to a stirred solution of dilute hydrogen peroxide ($H_2O_2$) which is made acid with a strong acid such as sulfuric acid. I prefer a pH about from 2 to 5. Three moles hydrogen peroxide are required to transform the ozonide groups of an exo-trimethylene cyclohexane into ketone groups (e.g. VIIa), or 1 mole hydrogen peroxide (H$_2$O$_2$) for each ozonide group. A tetramethylene cyclohexane (or octane) ozonide requires 4 moles hydrogen peroxide.

The strength of the hydrogen peroxide prior to addition to the ozonide may vary from about 3 to 30 parts H$_2$O$_2$ in 100 total parts, where parts are by weight. I prefer about from 5 to 15 parts H$_2$O$_2$ by weight in 100 parts commercially available hydrogen peroxide.

The net result is that the exocyclic methylene groups ( CH$_2$) of this example are first ozonized and the ozonides are then replaced with oxygen atoms, thereby forming 1,3,5-triketo cyclohexane (VIIa) and related compounds. These intermediate compounds then rearrange to form hydroxy compounds such as phloroglucinol (VI).

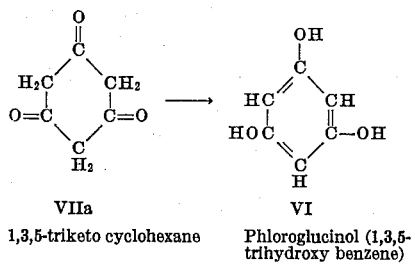

VIIa
1,3,5-triketo cyclohexane

VI
Phloroglucinol (1,3,5-trihydroxy benzene)

When the amount of ozone admitted to the reaction vessel is less than three moles per mole of exo-trimethylene cycloalkane, the ozonides formed can be used as precursors of phoroglucinol. These will be discussed more fully below. See Numbers (XII) and (XIV).

The phloroglucinol is liberated from the acidic mixture, by first decanting the aqueous layer which contains the sodium sulfate formed during the addition of the sulfuric acid and a part of the phloroglucinol. A portion of the phloroglucinol remains dissolved in the methylene chloride. This solvent is readily removed by vacuum and the phloroglucinol recovered. It may be further purified by recrystallizing from ethanol, 85 – 95 percent.

Most of the phloroglucinol in the water solution is recovered by partially evaporating the water by means known to those skilled in the art and subsequent filtration. As noted above, recrystallization from 85 to 95 percent by volume ethyl alcohol and 15 to 5 percent by volume of water will remove most of the impurities and produce a commercially acceptable phloroglucinol. I prefer the use of 90–95 percent ethanol.

EXAMPLE 2

In this example 1,3,5,7-exo-tetramethylene cyclooctane (IX) (1 mole — 160 g.) is substituted for the 1,3,5-exo-trimethylene cyclohexane (VII) in the process discussed above. Here four moles ozone are required (one mole ozone for each exo-methylene group) to form the ozonides which are then converted to 1,3,5,7-tetra-keto cyclooctane and related compounds by means of an acidic solution of hydrogen peroxide (pH 2 to 5). As noted above, 1 mole of the exo-tetramethylene compound will require 4 moles hydrogen peroxide, i.e., 1 mole hydrogen peroxide for each ozonide group.

The resultant ketone then rearranges in the aqueous solution to form the hydroxy, unsaturated cyclic compounds (IXb).

If less than 4 moles are reacted with the exo-tetramethylene cyclooctane, a mixture of mono, di, tri, and tetra ozonides of the cyclooctane results. Likewise, upon oxidation with hydrogen peroxide under mildly acid conditions (pH 2 to 5 using a strong acid — preferably sulfuric) only the ozonide groups will react with liberated oxygen to form keto groups which then rearrange to form hydroxyl groups.

When an exo-trimethylene cyclohexane is used and the amount of ozone admitted to the reaction flask (containing the cyclohexane, the solvent, the aqueous solution of metal hydroxides, preferably sodium hydroxide) is less than 3 moles, a mixture of mono, di, and tri-ozonides is formed. Upon oxidation of these ozonides, mono, di, and tri-keto groups result. These can be subsequently rearranged into mono, di, and/or tri-hydroxy compounds with some exo-methylene groups not ozonized. Such mixtures, after isolation, are useful in making intermediates, coatings, and resins.

For example, treatment of the oxygenated unsaturated compounds (XII and XIV) with formaldehyde yields glycols; these may be transformed into polymers by reaction, under appropriate conditions, with polybasic acids or polyisocyanates.

As a further example, the oxygenated unsaturated compounds (XII and XIV) may be irradiated or treated with peroxides (or other sources of free radicals) and converted into addition-type polymers. If desired, the oxygenated unsaturated compounds may be mixed with vinyl monomers such as styrene prior to irradiation or treatment with free radical sources.

As a further example, the oxygenated unsaturated compounds (XII and XIV) may be transformed into epoxy compounds, which are valuable chemical and resin intermediates.

The above process comprising the oxidation of exomethylene cyclic alkanes is simple and easily carried out in presently available commercial equipment. The resultant phloroglucinol (VI) has good purity, and as noted above, is commercially acceptable.

The extent of the conversion of the exo-cyclic CH$_2$ to ketones and other oxygenated compounds is dependent upon reaction conditions and the amount of ozone, or other oxidant, employed. Reducing the amount of oxidant, for example, will produce a mono-ketone or a di-ketone.

The oxonides formed in the first step of the ozonolysis operations discussed herein have value as oxidant, disinfectants, and auxiliaries in the polymerization of vinyl monomers and drying oils.

EXAMPLE 3

In this example the same general procedure described above is followed except that 1,2,4-trimethylene cyclohexane (VIII) is used instead of the 1,3,5-trimethylene cyclohexane compound. The resultant hydroxy aromatic compound is 1,2,4-trihydroxybenzene or hydroxyhydroquinone (V). This can be purified by converting (V) to the alkaline salt with a sodium hydroxide solution, filtering, treating the filtrate with an acid to give a pH of 2 to 4 whereupon the 1,2,4-trihydroxybenzene is precipitated and can be recovered by filtration.

The following also can be used as precursors of phloroglucinol:

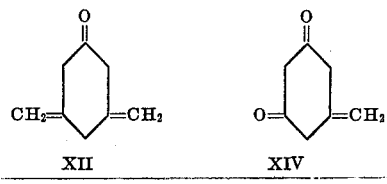

XII

XIV

The above described preparation of phloroglucinol (VI) and related compounds is not limited to (VII) and similar polymethylene cyclohexanes. For example, the following also can be used as precursors where R is alkyl or aryl having from one to 10 carbon atoms and the R groups can be identical or different.

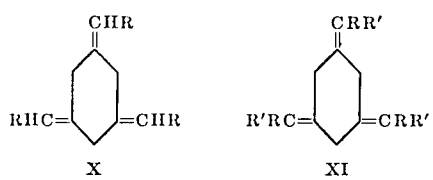

As indicated previously, oxidation of 1,3,5-trimethylene cyclohexane (VII) can also produce the following:

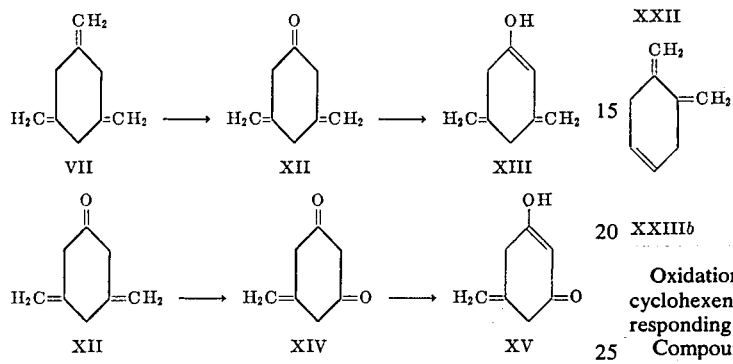

These ketones and hydroxy compounds can be rearranged to the following phenol and resorcinol compounds:

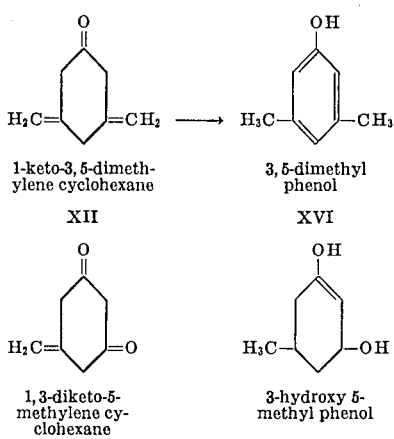

These ketones and hydroxy compounds are useful as chemical intermediates, solvents, plasticizers, and for making polymers.

The keto and hydroxy compounds referred to above may be transformed into useful products by several techniques, including:

Reaction with formaldehyde to obtain alcohols and glycols. The alcohols react with monobasic acids to yield solvents and plasticizers. The glycols react with polybasic acids or with polyisocyanates to yield polymers.

Copolymerization with vinyl-type monomers yields polymers having reactive functional groups.

Epoxidation of the carbon-carbon double bonds yields valuable epoxy compounds, which have value in making useful chemicals and polymers.

EXAMPLE 4

In this example the procedure described above is repeated using 2-methyl-1,3,5-trimethylene cyclohexane (XIX). The resultant product is 2-methyl phloroglucinol (XX).

When the above procedure is repeated with 2-phenyl-1,3,5-trimethylene cyclohexane (XXI), the resultant product is 2-phenyl phloroglucinol.

It is also within the scope of my invention that the various dimethylene-cyclohexenes (XXII), (XXIII), and (XXIV) be used as precursors of resorcinol (II), catechol (III), and hydroquinone (IV). It should be noted that the quantity of ozone admitted into the reaction vessel is one mole ozone ($O_3$) for each exo-methylene group. This quantity is easily determined by those skilled in the art, or by measuring the volume of ozone passing through the ozone measuring device.

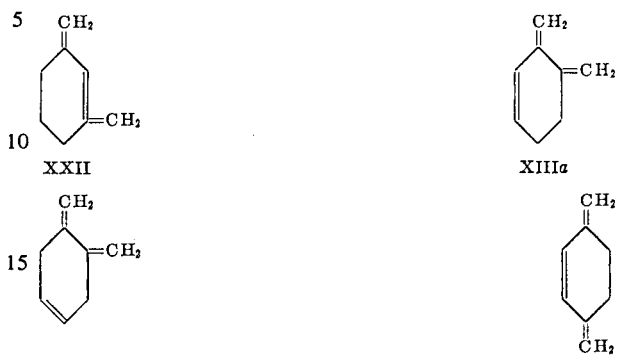

Oxidation of the exocyclic methylene groups of the cyclohexenes (XXII to XXIV) leads directly to the corresponding dihydroxy aromatic compounds.

Compounds belonging to the class of (XXII), (XXIII), and (XXIV) have been made from allene and acetylene (Benson & Lindsey, Jr., J. Am. Chem. Soc. 81, 4250 (1959); Ibid 81, 4253 (1959); and Benson, U. S. Patent U.S. Pat. No. 2,943,116 issued June 28, 1960). The latter reference discloses the use of these products for coatings. Since these compounds are known, the process of reacting allene and acetylene to obtain these compounds is not a part of my invention. What I am disclosing and claiming is a process for the use of these exo-methylene cyclohexenes as precursors for the preparation of cyclic compounds containing epoxy, ozonide, peroxide, keto or hydroxy groups.

An examples of the conversion of compounds (XXII), (XXIII), or (XXIV) is illustrated below. Compound (XXII) is particularly attractive as a raw material because it can be made from allene and acetylene as noted above.

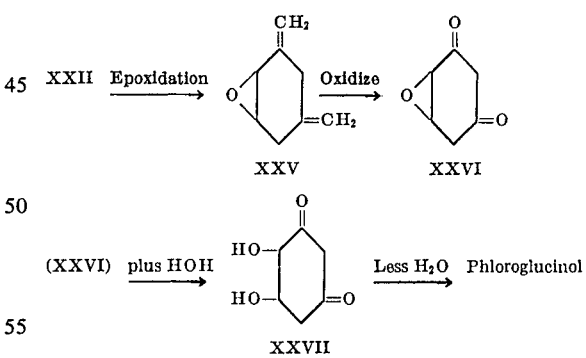

Compound (XXVII) also can be transformed in hydroxyhydroquinone.

Epoxidation can be carried out by use of peroxyacetic acid or metachloro perbenzoic acid. I prefer the metachloro perbenzoic acid.

EXAMPLE 5

Using the same equipment as described above, 1 mole (106 g) exo-2,4-dimethylene cyclohexene-1 (XXII) is dissolved in a suitable solvent such as ethyl acetate of chloroform. I prefer ethyl acetate. The metachloro perbenzoic acid is then added slowly with stirring. The amount (i.e., molar quantity) of perbenzoic acid added should be no greater than 1 mole, preferably about 0.9 to 0.95 moles. The epoxidation is carried out at temperatures below 0° C, preferably about from −10° to −20° C. The reaction is continued until a drop of the reaction mixture applied to starch-KI paper no longer shows a violet color indicating all the metachlorobenzoic acid has been consumed.

Ozonolysis of the exo-methylene groups and conversion to 2,4-diketo cyclohexane oxide (XXVI) are carried out as described above. Addition of a mole of water to (XXVI) produces the diglycol and the subsequent removal of a mole of water by heat or acid catalysis produces phloroglucinol which is easily recovered by crystallization.

EXAMPLE 6

Another method of converting dimethylene cyclohexene (XXII), through compound XXVI, into phloroglucinol (VI) is by rearrangement, using heat and acid or base catalysis, as shown below:

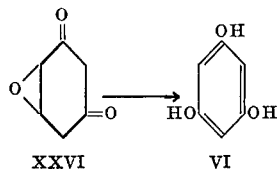

XXVI    VI

The tetramers of allene likewise can be converted into cyclic oxygenated compounds. A typical tetramer, 1,3,5,7-tetramethylene cyclooctane (IX) has been discussed above. Oxidation of this tetramer converts the exocyclic $CH_2$ groups into keto groups giving compounds some of which rearrange to form hydroxy ketones and hydroxy compounds.

I claim:

1. A process for preparing hydroxy aromatic compounds from dimethylene cyclohexene comprising:
    a. dissolving the dimethylene cyclohexene in at least one solvent selected from the group consisting of chloroform and ethyl acetate;
    b. epoxidizing the resulting solution of dimethylene cyclohexene with about 0.9 to about 0.95 mole perbenzoic acid at a temperature of about from 0° to −20° C. to produce a dimethylene cyclohexane 1,2-oxide;
    c. oxidizing the dimethylene cyclohexene oxide of step (b) with ozone to convert the methylene groups to the corresponding ozonide; ozonide;
    d. converting the ozonides of step (c) into diketo cyclohexane 1,2-oxide by means of an aqueous mineral acid solution of hydrogen peroxide, said acidic solution having a pH from 2 to 5;
    e. hydrolyzing the product of step (d) to form a 1,2-dihydroxy diketo cyclohexane;
    f. dehydrating the product of step (e) to remove one mole of water per mole of dihydroxy diketo cyclohexane thereby to produce a compound which spontaneously rearranges to form a trihydroxy benzene; and
    g. thereafter recovering the trihydroxy benzene.

2. A process according to claim 1 wherein the dimethylene cyclohexene is 2,4-dimethylene cyclohexene-1.

3. A process according to claim 1 wherein the dimethylene cyclohexene is 2,5-dimethylene cyclohexene-1.

4. A process according to claim 1 wherein the dimethylene cyclohexene is 2,3-dimethylene cyclohexene-1.

5. A process according to claim 1 wherein the dimethylene cyclohexene is 3,4-dimethylene cyclohexene-1.

* * * * *